United States Patent
Henderson

(10) Patent No.: US 6,948,758 B2
(45) Date of Patent: Sep. 27, 2005

(54) HINGE FOR A TONNEAU COVER

(75) Inventor: Jack V. Henderson, West Bloomfield, MI (US)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 10/481,315

(22) PCT Filed: Jun. 25, 2002

(86) PCT No.: PCT/CA02/00973
§ 371 (c)(1),
(2), (4) Date: Dec. 18, 2003

(87) PCT Pub. No.: WO03/001013
PCT Pub. Date: Jan. 3, 2003

(65) Prior Publication Data
US 2004/0169393 A1 Sep. 2, 2004

(51) Int. Cl.[7] .................................................. E05D 3/02
(52) U.S. Cl. .......................... 296/100.06; 296/136.03; 16/357
(58) Field of Search ....................... 296/100.01, 100.02, 296/100.06, 100.08, 136.03; 16/357, 360, 362

(56) References Cited

U.S. PATENT DOCUMENTS

| | | | |
|---|---|---|---|
| 1,100,919 A | 6/1914 | Seal | |
| 1,703,969 A | 3/1929 | Syvrud | |
| 2,732,580 A | 1/1956 | Schwaneke | |
| 3,682,348 A | 8/1972 | Roberts | |
| 4,861,092 A | 8/1989 | Bogard | |
| 5,653,491 A | 8/1997 | Steffens et al. | |
| 5,857,729 A | 1/1999 | Bogard | |
| 6,059,350 A | 5/2000 | Kooiker | |
| 6,082,806 A | 7/2000 | Bogard | |
| 6,227,602 B1 | 5/2001 | Bogard | |
| 6,317,929 B1 * | 11/2001 | Ring | 16/355 |
| 6,322,128 B1 | 11/2001 | Karrer | |
| 6,520,558 B1 * | 2/2003 | Katterloher et al. | 296/100.06 |
| 2001/0035664 A1 | 11/2001 | Karrer | |

FOREIGN PATENT DOCUMENTS

DE    195 14 389 A1    4/1995

* cited by examiner

Primary Examiner—Patricia L. Engle
(74) Attorney, Agent, or Firm—Clark Hill PLC

(57) ABSTRACT

A hinge assembly pivotally attaching a tonneau cover panel to a cargo bed of a motor vehicle. The hinge assembly includes a attachment bracket fixedly secured to the cargo bed of the motor vehicle. The attachment bracket defines a slot extending between a closed end and an open end, and the slot includes a pocket disposed adjacent the open end. The hinge assembly also includes a panel bracket fixedly secured to the tonneau cover panel. The panel bracket includes a base and a distal and defining an end aperture. The end aperture is alignable with the slot. In addition, the hinge assembly includes an attachment pin extending through the end aperture and received within the slot for movably securing the panel bracket with the attachment bracket. The movement of the panel bracket between the closed end and the open end moves the tonneau cover panel between a closed and a partially open position, and the movement of the attachment pin from the open end into the pocket allows pivotal movement of the tonneau cover panel from the partially open position to a fully open position.

7 Claims, 5 Drawing Sheets

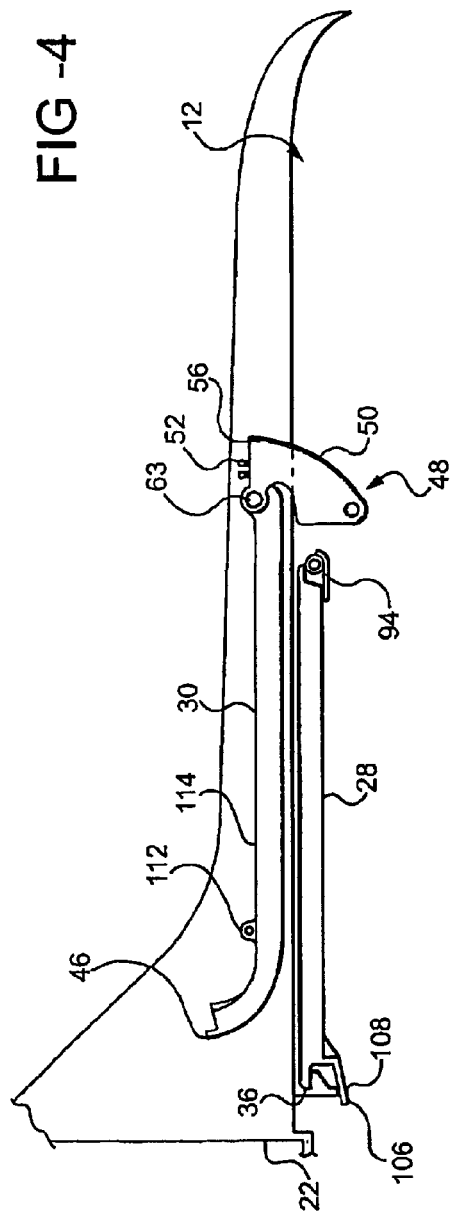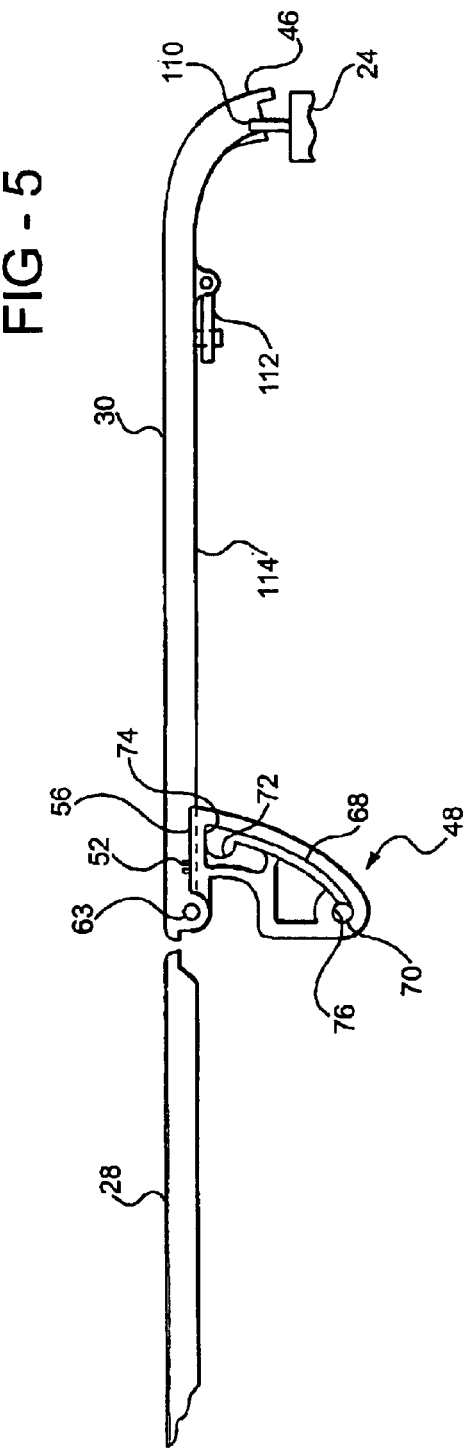

& # x20; # HINGE FOR A TONNEAU COVER

BACKGROUND OF THE INVENTION

1. Field of the Invention

This invention relates to a tonneau cover for a pickup truck. More particularly, this invention relates to a hinge assembly for attaching a tonneau cover panel to a cargo bed of a pickup truck.

2. Description of Related Art

Tonneau covers have become a popular add-on option for pickup trucks. The tonneau cover overlies a pickup truck cargo bed, which extends between a passenger compartment and a rear tailgate. The tonneau cover provides a covered storage area in the cargo bed. Because items stored underneath the tonneau cover are not easily accessible to persons outside of the pickup truck, these items are less susceptible to theft. In addition, the tonneau cover may be locked against the cargo bed to provide further protection from theft. As an added benefit, the tonneau cover improves vehicle aerodynamics.

Tonneau cover panels are heavy and large, especially when designed as a single panel to cover an entire cargo bed. This size requirement for the tonneau covers can make them unwieldy and difficult to manipulate, making lifting of the tonneau cover to access the cargo bed a difficult task.

Tonneau covers having multiple panels provide easier access to the cargo bed. Thus, when access to a portion of the cargo bed is desired, only one of the multiple panels must be manipulated, which is a much easier task than moving a single large panel. Such multi-panel tonneau covers can be in the form of multiple panels extending longitudinally from the front of the cargo bed to the back of the cargo, i.e., from the passenger compartment to the rear tailgate. Alternatively, the multiple panels may extend laterally. These multi-panel tonneau cover arrangements that allow one panel to be removed while another remains secured to the pickup truck, or that allow all of the panels to be removed, gives pickup truck operators a great deal of flexibility in adapting the cargo bed to fit their current needs.

SUMMARY OF THE INVENTION

According to one aspect of the invention, there is provided a hinge assembly for pivotally attaching a tonneau cover panel to a cargo bed of a motor vehicle. The hinge assembly includes an attachment bracket fixedly secured to the cargo bed of the motor vehicle. The attachment bracket defines a slot extending between a closed end and an open end. The slot includes a pocket disposed adjacent the open end. The hinge assembly also includes a panel bracket fixedly secured to the tonneau cover panel. The panel bracket includes a base and a distal end defining an end aperture. The end aperture is alignable with the slot. In addition, the panel bracket includes an attachment pin extending through the end aperture and received within the slot for movably securing the panel bracket with the attachment bracket. The movement of the panel bracket between the closed end and the open end moves the tonneau cover panel between a closed and a partially open position. And the movement of the attachment pin from the open end into the pocket allows pivotal movement of the tonneau cover panel from the partially open position to a fully open position.

BRIEF DESCRIPTION OF THE DRAWINGS

Advantages of the invention will be readily appreciated as the same becomes better understood by reference to the following detailed description when considered in connection with the accompanying drawings wherein:

FIG. 4 is a side view of one embodiment of the invention and a second panel of the tonneau cover in a fully open position over the first panel;

FIG. 5 is a side view of one embodiment of the invention and the second panel in a closed position.

DETAILED DESCRIPTION OF THE PREFERRED EMBODIMENT

Figure 1:
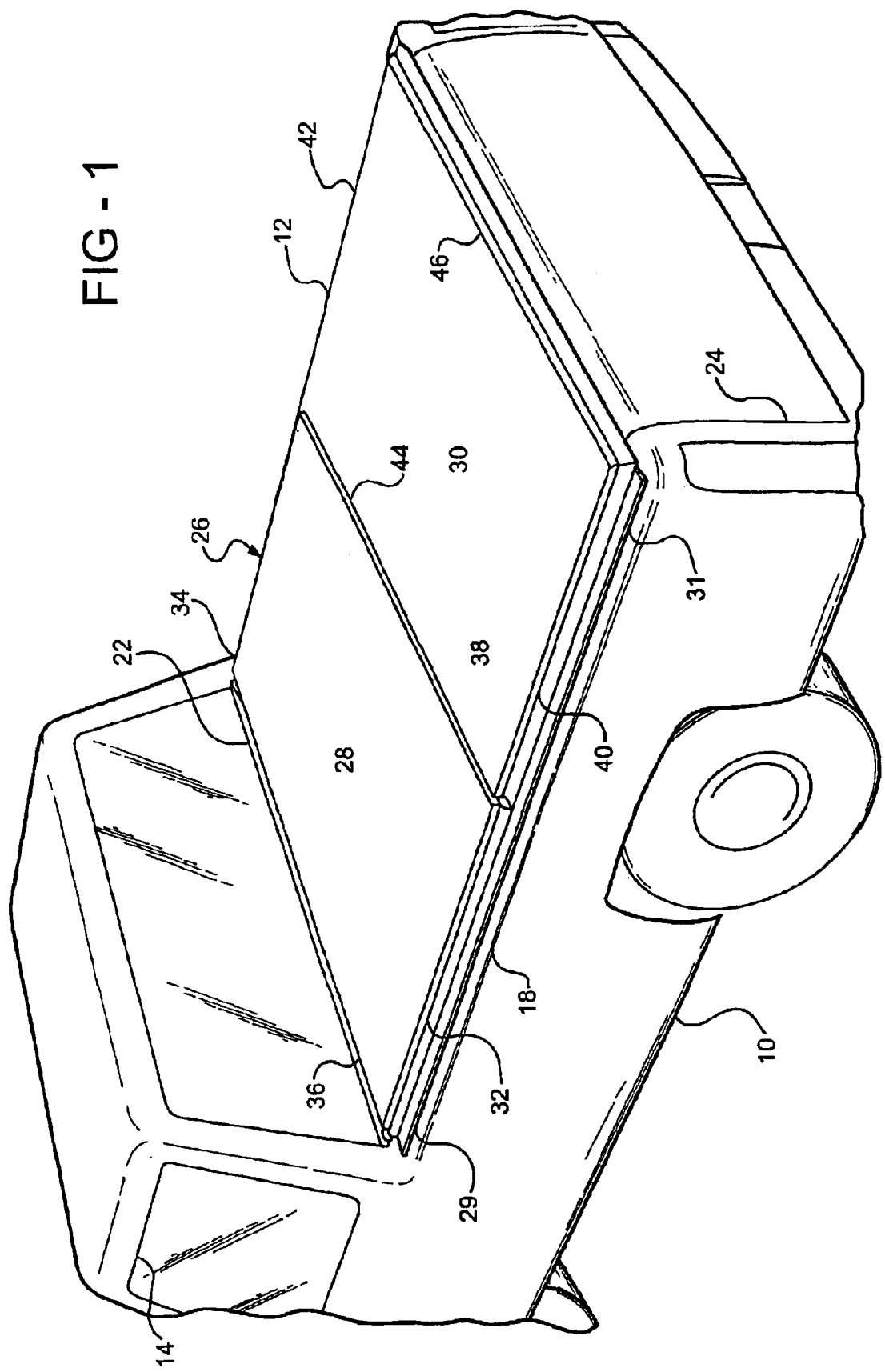
FIG. 1 is a rear perspective view of a pickup truck and a tonneau cover in a closed position.

Referring to FIG. 1, a pickup truck 10 includes a cargo bed 12 and a passenger compartment 14. The cargo bed 12 includes two opposed and generally parallel sidewalls 18, 20 extending between a forward wall 22, disposed adjacent the passenger compartment 14 and a rear tailgate 24.

A tonneau cover assembly, generally shown at 26, includes a first panel 28 and a second panel 30. The tonneau cover assembly 26 covers the cargo bed 12 making the pickup truck 10 more aerodynamic while the items stored therewithin are not visible to individuals outside of the pickup truck 10. In the embodiment shown, the first panel 28 covers a front portion 29 of the cargo bed 12, and extends between two sides 32, 34 adjacent the sidewalls 18, 20. The first panel 28 also extends between a front edge 36 adjacent the passenger compartment 14 and a rear edge 38.

The second panel 30 covers a rear portion 31 of the cargo bed 12 and extends laterally between two sides 40, 42 adjacent the sidewalls 18, 20. The second panel 30 also extends between a front edge 44, disposed adjacent the rear edge 38 of the first panel 28, and a rear edge 46 disposed adjacent the rear tailgate 24. It should be appreciated that the tonneau cover assembly 26 may include two or more panels positioned laterally or longitudinally between the sidewalls 18, 20 of the cargo bed 12, as disclosed in applicant's co-pending U.S. application Ser. No. 60/225,935, filed Aug. 17, 2000.

Figure 2:
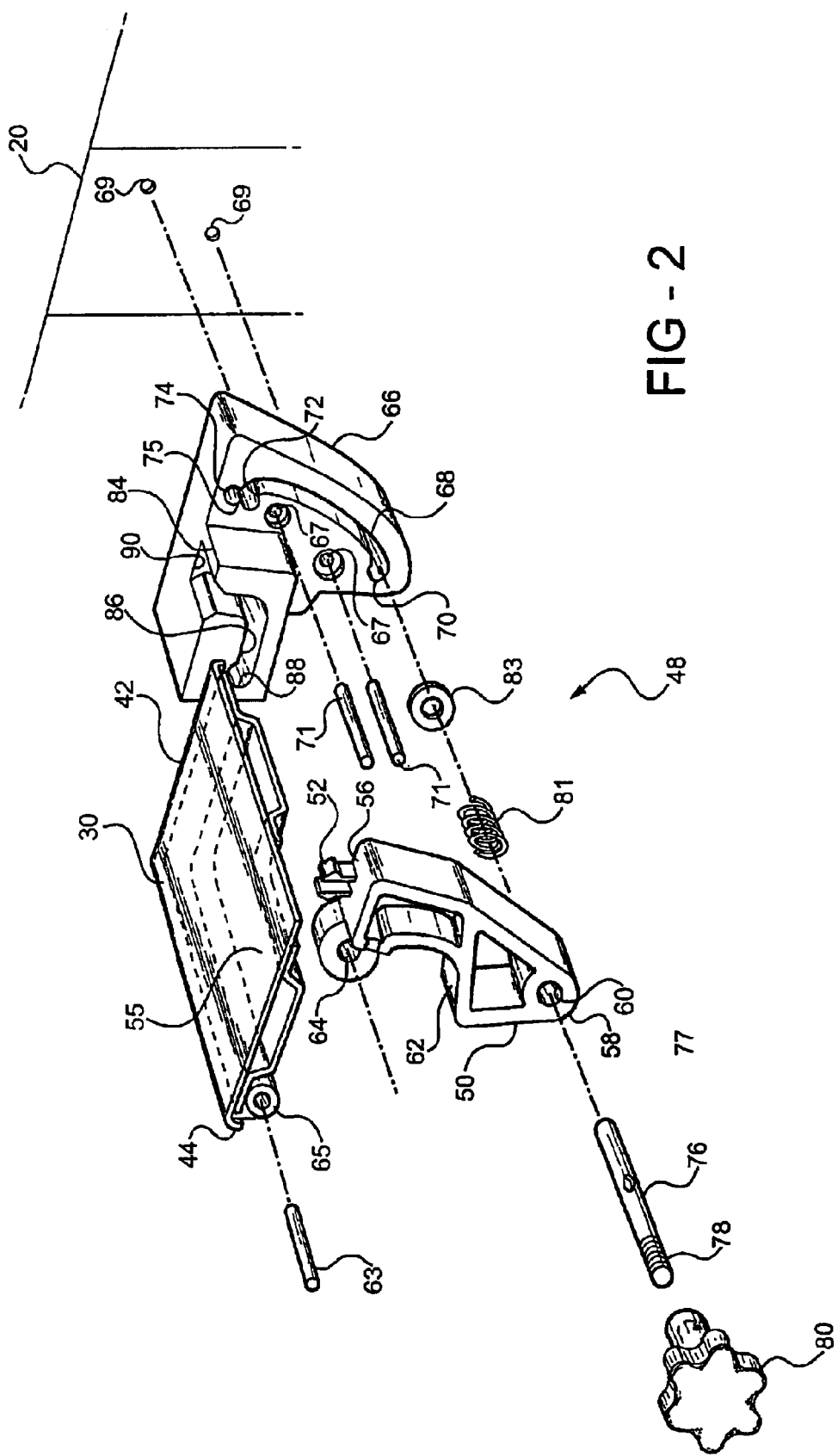
FIG. 2 is an exploded, perspective view of one embodiment of the invention.

Referring to FIG. 2, a hinge assembly, generally indicated at 48, allows for upward and pivotal movement of the second panel 30 relative to the cargo bed 12. The hinge assembly 48 includes a panel bracket 50, which includes a locking tab 52. The second panel 30 defines a plurality of slits 55 for selectively receiving the locking tab 52 therein whereby the second panel 30 is locked to the panel bracket 50. Thus, the second panel 30 is removably secured to the panel bracket 50. The panel bracket 50 includes a base 56 and a distal end 58 defining an end aperture 60. The panel bracket 50 also includes a widening surface 62 between the base 56 and the distal end 58. A pivot aperture 64 is disposed adjacent the base 56. A pivot pin 63 extends through the pivot aperture 64 and a panel aperture 65 of the second panel 30 to define a pivot axis about which the second panel 30 pivots with respect to the panel bracket 50.

The hinge assembly 48 also includes an attachment bracket 66 fixedly secured to each of the sidewalls 18, 20 (only one shown in FIG. 2). The attachment bracket 66 defines a plurality of bracket apertures 67 that are aligned with a plurality of sidewall apertures 69 defined by the sidewalls 18, 20. Securing devices 71, such as bolts, screws, rivets and the like, extend through the apertures 67, 69 to secure the attachment bracket 66 to the sidewalls 18, 20.

The attachment bracket 66 defines a slot 68 extending between a closed end 70 and an open end 72. The attachment bracket 66 also includes a pocket 74 that is disposed adjacent and is open to the open end 72 of the slot 68.

The hinge assembly 48 further includes an attachment pin 76 extending through the end aperture 60 and received within the slot 68 for defining the pivotal relationship between the panel bracket 50, and with it the second panel 30, and the attachment bracket 66. The attachment pin 76 is biased toward the attachment bracket 66 by a coil spring 81, which is held in place by a perch 83 for removable engagement with the slot 68. The attachment pin 76 defines a smooth end 77 and a threaded end 78 opposite to the smooth end 77. The smooth end 77 of the attachment pin 76 slides within the slot 68 between the closed end 70 and the open end 72, and into the pocket 74. The threaded end 78 threadingly engages a release knob 80, which is pulled to release the panel bracket 50 from the attachment bracket 66. It should be appreciated by those skilled in the art that pocket 74 does not have to be in communication with the slot 68 because the attachment pin 76 can be manually removed from the slot 68 and subsequently inserted into the pocket 74.

Figure 6:
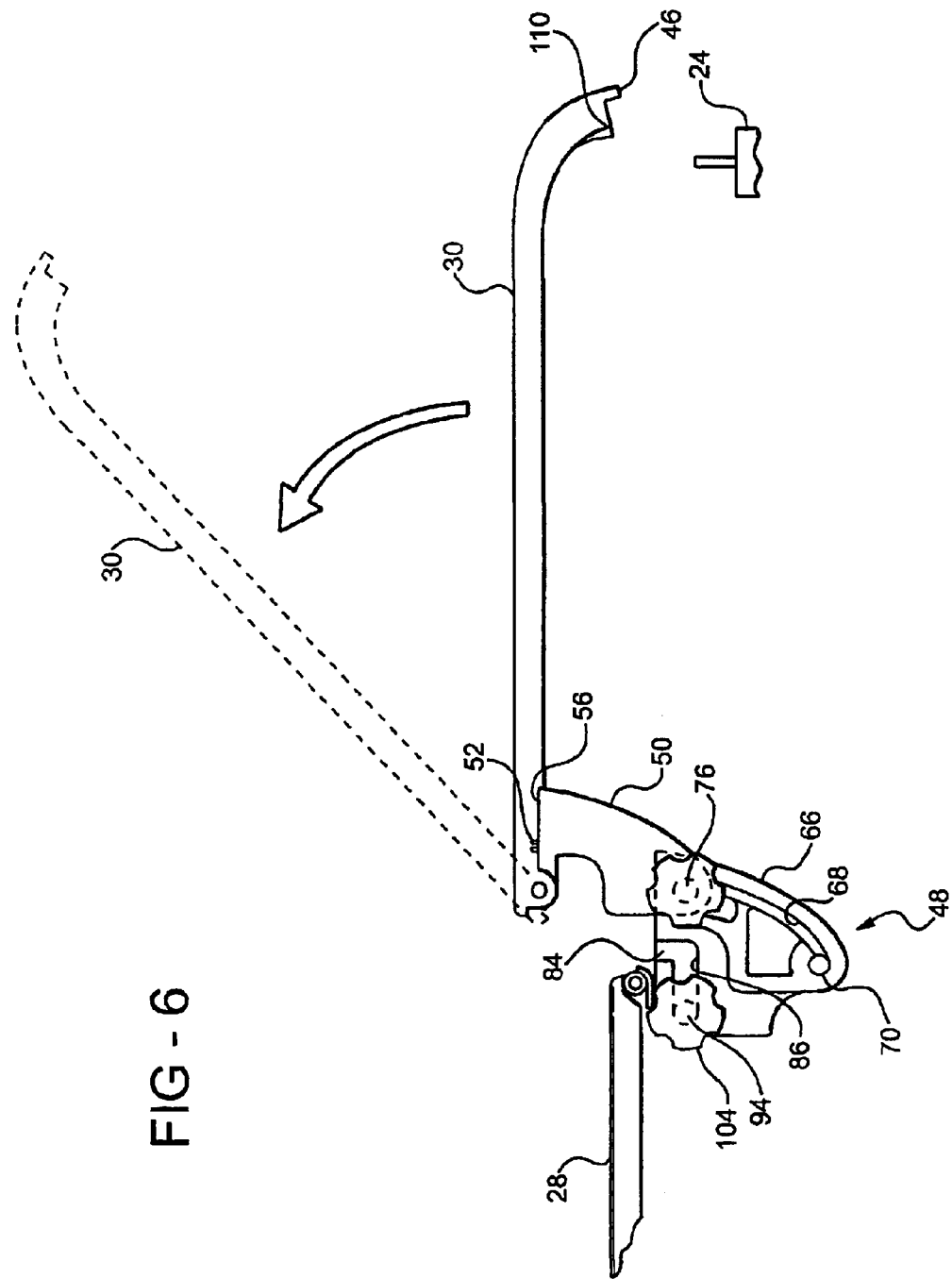
FIG. 6 is a side view of one embodiment of the invention and the second panel moving in a partially open position.

The movement of the attachment pin 76 within the slot 68 moves the second panel 30 between a closed position, as shown in FIG. 5, and a partially open position, as shown in FIG. 6. The movement of the second panel 30 is a translation to and away from the closed position. When the attachment pin 76 is positioned in the closed end 70 of the slot 68, the second panel 30 is in the closed position. Upon manually lifting the rearward panel 30 at the rear edge 46 thereof, the attachment pin 76 moves upwardly within the slot 68 toward the open end 72. The upward movement of the attachment pin 76 within the slot 68 elevates the panel bracket 50 and the second panel 30. When the attachment pin 76 reaches the open end 72, the rearward panel 30 is held in the partially open position.

To pivotally move the rearward panel 30 about its pivot axis from the partially open position to the fully open position shown in FIG. 4 (the pivoting of which is shown in phantom in FIG. 6), the second panel 30 is first forced upwards to urge the attachment pin 76 from the open end 72 into the pocket 74. The pocket 74 defines a lower pinched portion 75 for locking the attachment pin 76 therewithin. Once the attachment pin 76 is locked inside the pocket 74, the attachment pin 76 will not inadvertently slide back down the slot 68 towards the closed end 70 during pivoting of the second panel 30.

Figure 3:
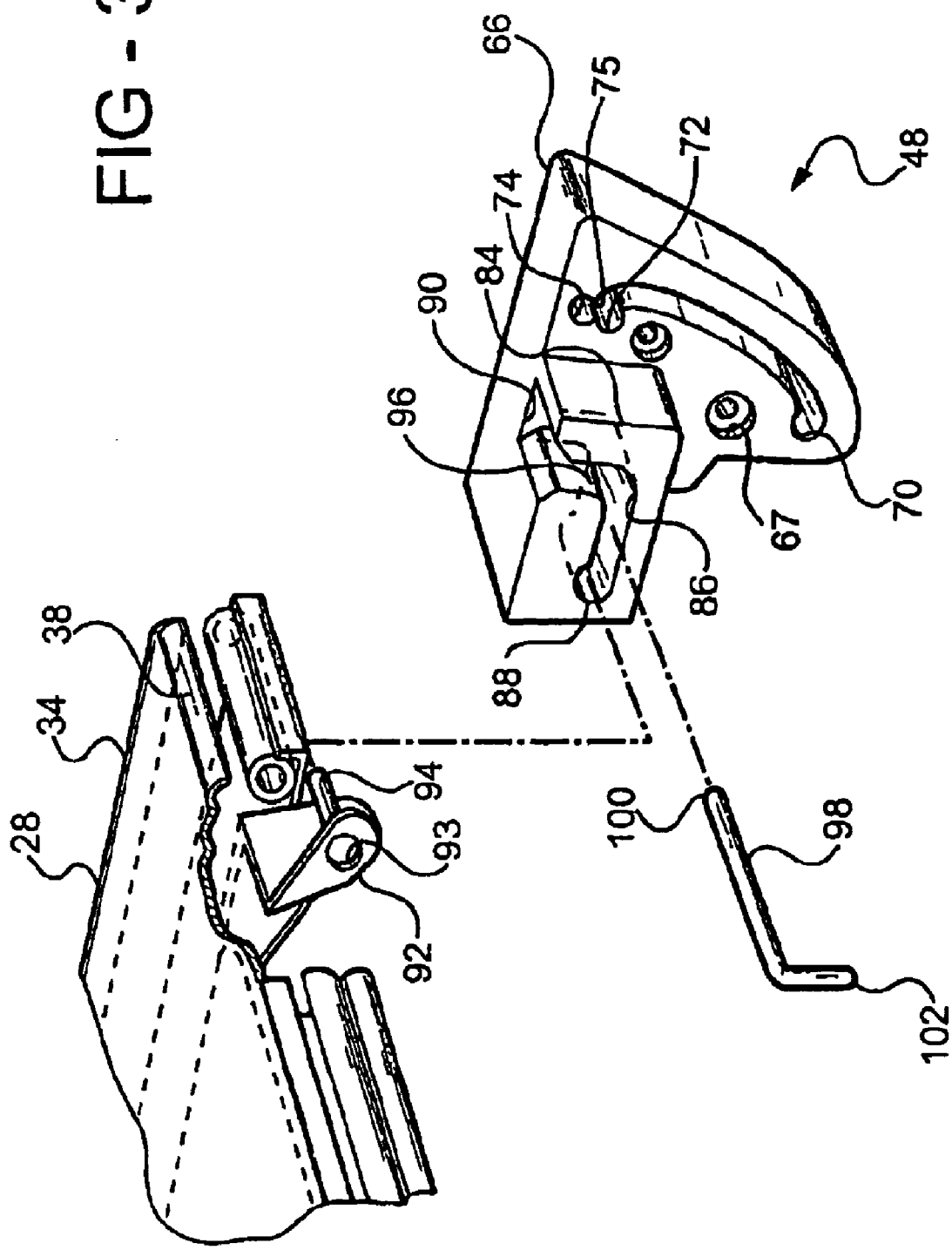
FIG. 3 is a perspective view of one embodiment of the invention and a rear edge of a first panel of the tonneau cover.

Referring to FIG. 3, the attachment bracket 66 includes a protrusion 84 defining a channel 86. The channel 86 extends between a locking end 88 and a channel opening 90. The channel 86 receives a guide pin 94 that is fixedly secured to the first panel 28 through a tab aperture 93 that is defined by a tab 92 extending out from the first panel 28. In the preferred embodiment, the first panel 28 includes a plurality of tabs 92 and tab apertures 93.

The guide pin 94 is movable between the locking end 88 and the channel opening 90. An aperture 96 extends from the channel 86 further into the protrusion 84. The aperture 96 receives a locking pin 98 that, when in place, prevents the guide pin 94 from moving therepast toward the channel opening 90. The locking pin 98 defines an aperture end 100, which slidingly engages the aperture 96, and a pull end 102. A pull knob 104 (shown in FIG. 6) may be secured to the locking pin 98 for releasing the locking pin 98 from the aperture 96 to allow the guide pin 94 to move to the channel opening 90.

Referring to FIG. 4, the first panel 28 includes a plurality of bayonet tabs 106 extending out from a front edge 36 thereof. The plurality of bayonet tabs 106 may be either fixedly secured to the first panel 28 or molded thereon. The forward wall 22 of the cargo bed 12 defines a plurality of openings 108 therealong. The plurality of bayonet tabs 106 are aligned with and then inserted into the plurality of openings 108 to removably secure the first panel 28 to the cargo bed 12.

Referring to FIGS. 5 and 6, the second panel 30 includes a lock system 110 positioned along the rear edge 46 thereof. The lock system 110 locks the second panel 30 in the closed position against the movable rear tailgate 24. When the second panel 30 is locked in the closed position, the first panel 28 cannot be removed because the presence of the second panel 30 in the closed position prevents the initial rear sliding movement of the guide pin 94 from the locking end 88 towards the channel opening 90. Thus, the lock system 110 locks both the first 28 and second 30 panels to the cargo bed 12.

The second panel 30 additionally includes a latch 112 mounted to an underside 114 thereof. The sidewalls 18, 20 define a plurality of latch apertures (not shown) that align with the latch 112 when the second panel 30 is in the fully open position. When the second panel 30 is in the fully open position, the latch 112 extends outwards and engages one of the plurality of latch apertures to hold the second panel 30 in its fully open position above the first panel 28. And when the second panel 30 is not in its fully open position, the latch 112 retracts to a non-use position.

In operation, starting with the first 28 and second 30 panels covering the cargo bed 12, the lock system 104 of the second panel 30 is unlocked. The rear edge 46 of the second panel 30 is pushed upwardly and slightly inwardly, toward the passenger compartment 14, to move the attachment pin 76 out of the closed end 70 of the slot 68 and into the slot 68. The second panel 30 is lifted upwards away from the cargo bed 12. This lifting movement causes the attachment pin 76 to move upwards within the slot 68 towards the open end 72. At the same time, the panel bracket 50 moves with the second panel 30 away from the cargo bed 12. The attachment pin 76 moves upwards within the slot 68 until the attachment pin 76 reaches the open end 72. At this time, the second panel 30 is in the partially open position (shown in FIG. 6), and part of a rear portion 31 of the cargo bed 12 is accessible for storing or removing items.

With the second panel 30 in the partially open position, the first panel 28 may either be pivoted open to provide access to the front portion 29 of the cargo bed 12, or the first panel 28 may be removed from the cargo bed 12 to provide an uncovered storage area in the rear portion 29 of the cargo bed 12.

The second panel 30 may further be lifted upward forcing the attachment pin 76 to move into the pocket 74. The attachment pin 76 is held inside the pocket 74 by the lower pinched portion 75. As the second panel 30 is lifted further, the second panel 30 disengages from the locking tab 52 and begins to pivot about the pivot axis. The second panel 30 pivotally moves into the substantially open position (shown in phantom in FIG. 6.) The second panel 30 can then be further pivoted to a fully open position, shown in FIG. 4, adjacent the first panel 28 after the operator of the tonneau cover assembly 26 forces the locking tabs 52 out of the slits 55, thus allowing the second panel 30 to move in relation to the panel bracket 50. The second panel 30 is secured in the fully open position by sliding the latch 112 into one of the plurality of latch apertures along the sidewalls 18, 20.

The hinge assembly 48 also provides for the removal of the first 28 and/or second 30 panel from the pickup truck 10. Again, starting with the first 28 and second 30 panels covering the cargo bed 12, as seen in FIG. 1, the lock system 104 of the second panel 30 is unlocked. The second panel 30 is moved into the partially open position. The release knob 80, as shown in FIG. 2, is pulled away from the attachment bracket 66 to release the attachment pin 76 from within the slot 68, thus releasing the second panel 30, with the panel bracket 50 attached thereto, from the attachment bracket 66 allowing removal thereof from the cargo bed 12.

The first panel 28 may be removed when the second panel 30 is minimally in the partially open position. More specifically, the first panel 28 may be removed when the second panel 30 is in any position other than the closed position, including when the second panel 30 is removed from the cargo bed 12. To remove the first panel 28, the locking pin 98 is pulled out of the aperture 96 to allow the guide pin 94 to slide in the channel 86 past the aperture 96 toward the channel opening 90. When the guide pin 94 reaches the channel opening 90, the first panel 28 may be lifted away from the attachment bracket 66 and removed from the cargo bed 12. Thus, both the first 28 and second 30 panels are removable from the cargo bed 12, either separately or at the same time, to allow access to the front portion 29 and/or the rear portion 31 of the cargo bed 12.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A hinge assembly for pivotally attaching a panel to a cargo bed of a motor vehicle, said hinge assembly comprising:

an attachment bracket fixedly secured to the cargo bed of the motor vehicle, said attachment bracket defining a slot extending between a closed end and an open end, said attachment bracket including a pocket disposed adjacent said open end;

a panel bracket fixedly secured to the panel, said panel bracket including a base and a distal end defining an end aperture, said end aperture alignable with said slot; and an attachment pin extending through said end aperture and received within said slot for movably securing said panel bracket with said attachment bracket such that movement of said panel bracket between said closed end and said open end moves the panel between a closed position and a partially open position, and movement of said attachment pin from said open end into said pocket allows pivotal movement of the panel from the partially open position to a fully open position.

2. A hinge assembly as set forth in claim 1 wherein said panel bracket includes a pivot aperture disposed adjacent said base end.

3. A hinge assembly as set forth in claim 2 including a pivot pin extending through said pivot aperture and the panel defining a pivot axis about which the panel pivots.

4. A hinge assembly as set forth in claim 3 wherein said panel bracket includes a locking tab for removably securing the panel thereto.

5. A hinge assembly as set forth in claim 4 wherein said pocket defines an inwardly protruding bottom portion for selectively locking said attachment pin therewithin.

6. A hinge assembly as set forth in claim 5 wherein said attachment pin includes a threaded end.

7. A hinge assembly as set forth in claim 6 including a release knob threadedly engaging said threaded end of said attachment pin.

* * * * *